Patented Feb. 21, 1939

2,148,051

UNITED STATES PATENT OFFICE 2,148,051

METHODS IN UTILIZING SUGAR CANE JUICE IN THE PREPARATION OF EFFERVESCENT ALCOHOLIC DRINKS

Juan Llodrá Talladas, Aparri, P. I.

No Drawing. Application July 31, 1936,
Serial No. 93,652

4 Claims. (Cl. 99—35)

It is well known in those countries where sugar cane grows and especially in the West Indies, that liquors are prepared by fermenting molasses obtained as residue from the manufacture of sugar, or submitting the juice of the sugar cane to a spontaneous fermentation. But the liquors obtained in this way, are not potable and are far from constituting a hygienic beverage, which is useful and agreeable to civilized people. It is for this reason that such products are only utilized in those countries in which the raw material is produced for the manufacture of rum.

My invention refers to a new, sparkling, potable, hygienic and nutritive beverage and its object is a new industrial use of the juice of the sugar cane and tropical fruits.

The process of making such beverages is based on the observation of certain qualities such as potableness, and flavor or characteristic fume of the musts that are subjected to alcoholic fermentation, depending to an extent on the specie and quality of the ferment used and the medium in which such ferments develop. Repeated experiments has demonstrated that by planting different species of ferments in different receptacles containing fermentable juices of the same kind, different musts are obtained each having its peculiar characteristics and composition.

Based upon these observations I planted a culture of pure yeast of the species *Saccharomyces ellipsoideus* in the filtered and sterilzed juice of sugar cane, the saccharose of which has been previously hydrolized by the action of tartaric acid and by the addition of the juices of fruits, rich in citric acid and thereby obtained musts similar in every way to the best grape wine.

The procedure I followed is the following:

Sugar cane juices pressed out from perfectly healthy and well seasoned plants, were treated while flowing from the rollers, with sufficient quantity of liquid sulfur dioxide to obtain an average of from 5 to 10 grams of liquid $SO_2$ for every hectoliter of juice.

The juice that has been sterilized by the action of sulphur dioxide gas is filtered under pressure and collected into a tin plated sugar-boiler provided with a steam coil; or the juice is passed thru an evaporating apparatus to concentrate the musts until a density of 1080 to 1100 is reached. It is no trouble (and it is more economical) to concentrate the musts by adding the necessary amount of pure cane sugar while the temperature of the must is between 95° and 100° C. while maintaining the temperature indicated, it is then transferred to the fermentation vats, which have been previously sterilized, where the saccharose contained in the must is hydrolized by the addition of any one of the following mixtures of every 100 liters of must depending on the characteristic bouquet of the type of wine which is desired.

|  | Grams |
|---|---|
| 1.—Juice of *Citrus decumanus* | 2,500 |
| Juice of *Citrus aurantium* | 2,500 |
| Pure tannic acid | 50 |
| 2.—Juice of *Citrus limetta* | 500 |
| Juice of *Citrus aurantium* | 2,500 |
| Juice of *Citrus limonum* | 500 |
| Honey | 1,500 |
| Pure tannic acid | 50 |
| 3.—Juice of *Citrus aurantium* | 500 |
| Juice of *Citrus limonum* | 1,500 |
| Juice of *Citrus decumanus* | 2,000 |
| Honey | 500 |
| Peeled banana fruits boiled for 30 minutes under 25 pounds pressure | 5,000 |
| Pure tannic acid | 50 |
| 4.—Juice of *Citrus decumanus* | 2,500 |
| Juice of *Citrus aurantium* | 2,500 |
| Pure tannic acid | 50 |

Any of the aforesaid mixtures or a combination of them or other similar mixtures composed of fruits rich in citric acid can be intimately mixed with the musts keeping the temperature between 80 and 90° C. while the mixing is going on. When the musts are cooled down the degree of acidity is determined and brought up to the total of 0.5% by adding the necessary quantity of the following compound:

|  | Grams |
|---|---|
| 5.—Pure tartaric acid | 28,490 |
| Bitartrate of potash | 71,510 |
| Total | 100,000 |

There is abundant literature on oenology and vinicology which gives an explanation about the proper conditions of wine cellars and fermentation vats. Any of the type recommended by viniculture can be advantageously utilized in the present case, but it is preferred to use fermentation vats of not more than 5 to 6 thousand liters capacity.

The pure yeasts which are used for fermenting the musts described above, are obtained by exposing the juice of the muscat grape to a spontaneous fermentation by placing it on a bed of fresh bagasse of sugar cane. The homogeneous ferment cells of *Saccharomyces ellipsoideus* that has grown in the said juice are isolated and are then cultivated in Pasteur's matrass. These cultures are planted on a Fernbach or Jacquemin apparatus containing musts prepared in the following manner:

5 kg. of stemless raisins of the muscat grape specie are crushed until they are reduced to a homogeneous pulp. Add to this pulp 3 to 5 times its weight of distilled water depending on its richness in glucose and the must obtained thereby is filtered so as to separate the pellicle and seeds of the raisins. The filtered must is poured into the Fernbach or Jacquemin apparatus where it is properly sterilized before planting the selected culture. Part of this must, while in the active state of fermentation, is planted on other portions of musts in the Fernbach or Jacquemin apparatus which will serve later on as yeast to initiate the fermentation of other musts. With this procedure the yeast is changed only once a month.

In order to obtain the alcoholic fermentation in one hectoliter of the sugar cane musts it is necessary to reduce the temperature to 22 or 25° C., taking due care to insure a perfect asepsis. To these musts are added a 5 kg. of yeast and 20 grams of ammonium phosphate diluted in a sufficient amount of the same musts.

The fermentation starts after a few hours and it must be treated according to ways prescribed by the modern oenology since these musts behave exactly like the musts of grapes.

Generally 5 to 6 days are sufficient to transform the glucose contained in the must into alcohol. The active fermentation ceases and the yeasts and part of the suspended tartrates in the liquid settle at the bottom of the vats.

This is the proper moment to transfer the wine into oak barrels which have been sterilized by sulphur dioxide. In these barrels the complementary fermentation takes place, after which, the wines already cleared and limpid are transferred into other barrels where the wines are allowed to mature for one or more years.

To make these wines sparkling, two methods are followed:

The first is by bottling the wine while in the stage of complementary fermentation.

In this case, before the complete change of the sugar into alcohol is affected, the principal fermentation is interrupted by successively transferring the wines from one vat to another and clarifying them with animal albumin and a small quantity of tannin until clear and limpid wines are obtained.

While in this condition and before putting it in bottles, the following mixture is added to the wines:

6.—Sugar candy _____ kg __ 36
Grape wine _____ liters __ 29
Muscat grape wine _____ do ____ 10
Brandy of cognac _____ do ____ 5
Saturated solution of tartaric acid _____ do ____ 9
Saturated solution of tannic acid _ do ____ 19
Saturated solution of alum _____ do ____ 2
Fresh water, c. s. to make _____ do ____ 100

If the quantity of sugar in the wine does not reach 2%, then the necessary additional quantity of sugar candy is added.

The bottles duly corked are deposited horizontally in a storehouse where the temperature is not more than 25° C.

Day after day, while the complementary fermentation is going on, the bottles are shaken vigorously and the bottom part is elevated gradually so that the ferments and the albuminous tannates suspended in the liquid are deposited at the cork. After fifteen days, the bottles are placed bottom up and are kept in this position until the wine becomes clear and limpid.

Then, the bottles are uncorked, with the nozzle downward. The expansion of the gas throws the sediment which has gathered at the cork out violently together with about 30 to 50 c. c. of wine which is conveniently received. By means of a machine, the bottles are refilled with wine saturated with carbonic acid gas and are corked again ready for the market.

The wine used to refill the bottles is either sweet or dry according to the type of sparkling wine desired.

The second procedure consists in saturating the wine with carbonic acid gas while it is being bottled in the cool state.

What I claim and desire to secure by Letters Patent, is:

1. A process for the manufacture of wine from the juice of sugar cane which comprises disinfecting the fresh juice with sulfur dioxide, filtering it, increasing its content of cane sugar to a density of 1080–1100, hydrolysing the juice by tannic acid and the juice of Citrus genus, adjusting its acidity by a mixture of tartaric acid and potassium tartrate, and fermenting by a pure culture of organisms obtained by spontaneous fermentation of muscat grape juice mixed with sugar cane bagasse.

2. A process for the manufacture of wine from the juice of sugar cane which comprises disinfecting the fresh juice with sulfur dioxide, filtering it, increasing its content of cane sugar to a density of 1080–1100, hydrolysing the juice by tannic acid and the juice of Citrus genus, adjusting its acidity by a mixture of tartaric acid and potassium tartrate, fermenting by a pure culture of organisms obtained by spontaneous fermentation of muscat grape juice mixed with sugar cane bagasse, and subjecting to complementary fermentation.

3. A process for the manufacture of wine from the juice of sugar cane which comprises disinfecting the fresh juice with sulfur dioxide, filtering it, increasing its content of cane sugar to a density of 1080–1100, hydrolysing the juice by tannic acid and the juice of Citrus genus, adjusting its acidity by a mixture of tartaric acid and potassium tartrate, fermenting by a pure culture of organisms obtained by spontaneous fermentation of muscat grape juice mixed with sugar cane bagasse, subjecting to complementary fermentation, and packaging and charging with carbon dioxide.

4. The process of manufacturing a champagne wine having the odor and flavor of grape champagne wine, which comprises the addition of sulfurous acid to fresh sugar cane juice, filtering the product, concentrating it to the desired density, adding thereto tannic acid and the juice of fruits rich in citric acid, adding the flavoring substances desired for the completed wine, pasteurizing the mixture, adjusting its acidity to a titer of 0.5% by a mixture of tartaric acid and bitartrate of potassium and fermenting it with wine yeast of that variety developed during the spontaneous fermentation of muscat grape pulp in mixture of sugar cane bagasse.

JUAN LLODRÁ TALLADAS.